United States Patent [19]

Hanson

[11] 4,136,085
[45] Jan. 23, 1979

[54] PROCESS FOR CONTROLLING THE MELT FLOW OF AMIDE-IMIDE POLYMERS

[75] Inventor: Robert B. Hanson, Aurora, Ill.

[73] Assignee: Standard Oil Company (Indiana), Chicago, Ill.

[21] Appl. No.: 871,103

[22] Filed: Jan. 20, 1978

[51] Int. Cl.$^2$ .............................................. C08G 73/14
[52] U.S. Cl. .................................................... 528/189
[58] Field of Search ...................... 260/47 CD, 78 TF

[56] References Cited

U.S. PATENT DOCUMENTS 3,920,612  11/1975  Stephens .......................... 260/47 CP
4,048,144   9/1977  Stephens .......................... 260/47 CP

*Primary Examiner*—Lester L. Lee
*Attorney, Agent, or Firm*—Stephen L. Hensley; Arthur G. Gilkes; William T. McClain

[57] ABSTRACT

An improved process for preparing amide-imide polymers which at a percent solids of 98±2% have a melt flow in the range of about 1 to about 200 g/10 min. by the addition of an effective amount of trimellitic acid anhydride to 4-trimellitoyl anhydride halide (4-TMAH) and one or more aromatic diamines during reaction in an organic solvent.

4 Claims, No Drawings

PROCESS FOR CONTROLLING THE MELT FLOW OF AMIDE-IMIDE POLYMERS

BACKGROUND OF THE INVENTION

1. Field of the Invention

The field of this invention involves polyamide-imide or amide-imide polymers prepared in an organic solvent.

2. Background

The prior art processes, which are improved by this invention, are disclosed in U.S. Pat. No. 3,920,612 (1975) and U.S. 4,048,144 (1977). Both U.S. Pat. No. 3,920,612 (1975) and U.S. Pat. No. 4,048,144 (1977) are incorporated herein by reference.

The polymers and copolymers prepared in accordance with those processes have been found useful in a wide variety of applications. For example, they are disclosed as useful for molding in U.S. Pat. No. 4,016,140 (1977) and U.S. Pat. No. 3,573,260 (1971) both these U.S. patents for molding being incorporated herein by reference, and for wire coatings in U.S. Pat. No. 3,661,832 (1972), U.S. Pat. No. 3,494,890 (1970), and U.S. Pat. No. 3,347,828 (1967).

While molding powders prepared according to the above patents have excellent properties, it has been difficult to consistently produce products having identical properties due to variations in the source and age of the 4-trimellitoyl anhydride halide, which is usually in the form of a chloride and is in that form hereinafter referred to as TMAC. This has been manifested in variations in the injection moldability of the polymers. Accordingly, there is a need for a process which consistently provides polyamide-imide polymers having uniform molding properties.

Our studies have shown injection molding properties of a polyamide-imide are closely related to the melt flow of the polyamide-imide which is in turn related to both the molecular weight and percent imidization of the polyamide-imide. The polymer preferably should have a melt flow of 1 or more grams/10 minutes to produce a satisfactory injection molded article, i.e., one having according to ASTM D1708 an ultimate tensile strength in the range of 15-30 thousand pounds per square inch (psi) and a percent elongation at break in the range of 5-20%. If the polymers have a melt flow much below about 1 g/10 min., the molded articles made therefrom have a substantially decreased ultimate tensile strength below that which can otherwise be achieved for that particular polymer after a process of heat annealing. Also injection molding such polymers is generally much more difficult. Examples of such difficulties are: incomplete filling of the mold, i.e., short shots, and poor appearance of the molded article. If the melt flow is too high, due to too small a percentage of imidization after a precure drying step, explained in U.S. Pat. No. 4,016,140 (1977) as a final heat treatment prior to molding comprising heating at about 300° to about 700° F. for about 0.5 to about 5 hours, then the water liberated during the injection molding process and subsequent annealing causes blistering, voids, and in general an unsatisfactory molded article.

The general object of this invention is to provide polyamide-imide molding powders which have more consistent injection molding properties than heretofore available.

Another object of this invention is to provide a method for controlling the molecular weight and melt flow of polyamide-imides prepared from a 4-trimellitoyl anhydride halide (4-TMAH) and one or more aromatic diamines.

Other objects of this invention will be clear from the Specification.

The objects of this invention can be achieved by the improved process of this invention, which comprises reacting in an organic solvent with each mole of one or more aromatic primary diamines, between about 0.92 and 0.99 mole of substantially pure 4-trimellitoyl anhydride halide, and between about 0.08 and 0.01 mole of trimellitic acid anhydride. A substantially pure sample of 4-TMAH means that there is at least about 98.5 percent by weight of 4-TMAH within said sample. TMA in the above reaction is functioning as a capping agent, which uniquely modifies the injection molding properties of the amide-imide polymer produced according to the procedure hereinafter set out. The TMA modifies the molecular weight of the polymer produced in the above reaction. The change in molecular weight of a polyamide-imide polymer has an effect on both melt flow and injection molding properties of the polymer.

It is known that capping agents can have an impact upon melt flow and other polymer properties when added to a reaction. Many capping agents have been investigated with respect to modifying the injection molding properties of polyamide-imide polymers. It has been found that aromatic or aliphatic monoacyl halides, aromatic dicarboxylic acid anhydrides and aromatic tricarboxylic acids such as trimellitic acid are not useful capping agents with respect to forming useful injection molding powders of amide-imide polymers prepared in an organic solvent. However, TMA has been found surprisingly to be a unique capping agent for polyamide-imide polymers in that it produces a useful injection moldable polymer which can be readily annealed in the solid state to improve the tensile properties of a molded article made therefrom.

In somewhat greater detail, the process of this invention comprises reacting preferably under anhydrous conditions TMA, TMAC and one or more aromatic diamines in an organic solvent, wherein the total number of moles of both TMA and TMAC is approximately equal to the total number of moles of all aromatic diamines and wherein the ratio of the moles of TMAC to the moles of TMA is in the range of between 11:1 and 99:1. The organic solvent is selected both for its relative unreactivity as compared to the aromatic diamines used and its ability to dissolve the polyamidepolyacid polymers produced during reaction.

The reaction is preferably run in two steps. The first step is at a temperature high enough to maintain the exothermic reaction between the anhydride and acyl halide groups and the aromatic amine groups while avoiding the formation of so many imide linkages that the solubility of the polymers formed decreases appreciably. It is known that polyamide-imide polymers are much less soluble than their polyamidepolyacid counterparts. The time period and the corresponding temperature range appropriate to this first step is between about 1 and about 24 hours and between about 32° F. and about 212° F. and preferably between 2 and 4 hours and between about 77° F. and 113° F.

The completion of the first step is indicated by the viscosity of the organic solvent phase approaching a maximum value. For example, a solution of N,N-dimethylacetamide containing 30% solids measured at 77° F. has an observed maximum viscosity of about 110 poises.

Subsequent to the completion of the first step, the polyamidepolyacid, generally free of imide linkages, is isolated by precipitation in water sufficiently low in cation concentration to avoid significant degradation of those polymer properties which are useful in molding applications. It is known that polyamide-polyacid polymers absorb cations, therefore when the polymer formed is rinsed with several washings of water, so as to remove substantially all of the hypohalous acid produced during the reaction, deionized or distilled water is preferred. The polymer, isolated from the aqueous solution after having been washed to the point where washings show a pH of about 4 or greater, are dried and then cured. Curing at between 300° F. and 700° F. is necessary to transform the polymidepolyacid into a material having useful molding properties. During this cure there is both an imidization of substantially all amide linkages capable of being so transformed and an increase in observed molecular weight. For more details of washing, drying, curing, and molding see U.S. Pat. No. 4,016,140 (1977).

In general, the aromatic diamines contemplated by this invention have one or more aromatic rings and at least two primary amino groups. Examples of such aromatic primary diamines are set out in U.S. Pat. No. 3,494,890 (1970) and U.S. Pat. No. 4,016,140 (1977) both incorporated herein by reference. It is to be noted that a polymer can be made comprising more than one aromatic diamines, i.e., a copolymer. Particularly useful copolymers often have better flow properties than polyamide-imides containing only one aromatic primary diamine due to the possibility of tailoring the melt flow characteristics of polyamide-imides made therefrom. Polymers that have been found to have particularly suitable properties for injection molding have been made from aromatic diamines selected from the group consisting of metaphenylenediamine, p, p'-oxybis (aniline) and p,p'-methylene bis (aniline). These are particularly useful because of the ultimate tensile strength and elongation at break found in such polyamide-imide co-polymers upon conventional injection molding.

Examples of other aromatic primary diamines useful in this invention are p,p'-sulfonylbis(aniline), (p-aminophenyl) sulfone, and p,p'-phenylenediamine.

Some useful relatively inert organic solvents in this invention which contain nitrogen are N,N-dimethylacetamide, N-methyl pyrrolidone, and the like. Phenols and alkyl-substituted phenols are also generally useful organic solvents in the invention. Such solvents are exemplified by combinations of one or more of the following o-, p-, and m-cresols and xylenols.

More specifically, the polymers at about 98 ± 2% solids produced according to the procedure fully set out in the example entitled, "GENERAL PREPARATIVE PROCEDURE," can be made to have a melt flow rate in the range of about 1 to about 200 grams/10 minutes. The quantities of reactants used to produce, according to the above procedure, an amide-imide polymer having a selected melt flow within the above range are shown in the following table. It is important to realize that amide-imide polymers undergo imidization throughout the steps of formation, isolation, and drying. It is not known the precise percent of imidization that occurs during any particular step, and it is only by means of following a particular set of process conditions that reproducible melt flow values can be obtained.

| Melt Flow in grams/10 min. Polymer Produced | Moles of Aromatic Primary Diamines | Moles of TMA | Moles of Substantially Pure TMAC |
|---|---|---|---|
| less than 5 | 1 | 0 to 0.02 | 100 to 0.98 |
| 5 to 40 | 1 | 0.03 to 0.06 | 0.97 to 0.94 |
| greater than 40 | 1 | more than 0.06 | less than 0.94 |

DETAILED DESCRIPTION OF THE INVENTION

GENERAL PREPARATIVE PROCEDURE

A 200 ml. round bottom 4-neck flask, equipped with a nitrogen inlet tube, stirrer, thermometer, and solids addition funnel, was charged with 99.9 parts by weight of (pbw) p,p'-oxybis(aniline) (OBA), 23.1 pbw meta-phenylenediamine (MPDA) and 604 pbw N-methylpyrrolidone (NMP). When solution at room temperature (72° F.) was complete, 150 pbw 4-trimellitoyl anhydride chloride (4-TMAC), having a percent purity of 99.5% ± 0.5% as determined from chloride content, was added over 2.5 hours while maintaining a solution temperature of between about 77–95° F. When addition was complete the solution was stirred for 3 hours during which time the solution viscosity increased to a Gardner-Hold value of Z5+ or about 110 poises.

Solid polymer was obtained by first pouring the viscous solution into twice its volume of distilled water in a Waring blender and then filtering. The filtrate is washed with 5 increments of 3000 pbw each of distilled water to remove hydrogenchloride that had been generated during reaction.

The solid was dried under a vacuum of 20 inches of mercury for 24 hours at 122° F. M.F., percent solids (as discussed hereinafter) and I.V. were measured for this material and are reported in TABLE 1 under Initial.

160 g of the above material was heated for 2 hours in an oven set at 425° F. M.F., percent solids and I.V. were measured for this further heated material and are reported in TABLE 1 under Final.

The percent solids throughout this Specification and claims is determined from the initial and final weights of a sample measured before and after it was both heated in an oven at 500° F. for 20 minutes and equilibrated in a phosphorous pentoxide desiccator for 25 minutes.

Compositions 2–8 were prepared and treated according to the same procedure as employed for composition 1 above except that:
in compositions 2–8, in place of some of the 4-TMAC; TMA, acetyl chloride, phthalic anhydride, benzoyl chloride, and trimellitic acid were used, and
in composition 4, different concentrations of OBA and MPDA were used.

TABLE I

| Composition | Initial | | Final | |
|---|---|---|---|---|
| 1) *A + 150 pbw 4-TMAC | **I.V. 0.40 ***M.F. 12 | (91.3%) | I.V. 0.59 M.F. 0.4 | (99.0%) |
| 2) A + 145.5 pbw 4-TMAC 4.1 pbw TMA | I.V. 0.33 M.F. 24 | (91.0%) | I.V. 0.44 M.F. 5 | (98.1%) |
| 3) A + 142.5 pbw 4-TMAC 6.8 pbw TMA | I.V. 0.28 M.F. + 300 | (91.5%) | I.V. 0.49 M.F. 17 | (99.2%) |
| 4) A + pbw 4-TMAC | I.V. 0.26 | | I.V. 9.5–0.55 | |

TABLE I-continued

| Composition | Initial | | Final | |
|---|---|---|---|---|
| 10.95 pbw TMA | M.F. + 300 | (91.5%) | M.F. 100 | (98.1%) |
| 5) A + pbw 4-TMAC | I.V. 0.27 | | I.V. 98.9 | |
| 2.8 pbw Acetyl Chloride | M.F. + 300 | (91.0%) | M.F. 242 ****[148] | (98.9%) |
| 6) A + 142.5 pbw 4-TMAC | I.V. 0.26 | | I.V. 0.39 | |
| 5.3 pbw Phthalic Anhydride | M.F. + 300 | (92.3%) | M.F. 231 [132] | (98.5%) |
| 7) A + 142.5 pbw 4-TMAC | I.V. 0.28 | | I.V. 0.46 | |
| 5 pbw Benzoyl Chloride | M.F. + 300 | (92.8%) | M.F. 119 [108] | (98.6%) |
| 8) A + 142.5 pbw 4-TMAC | I.V. 0.25 | | I.V. 0.37 | |
| 7.5 pbw Trimellitic Acid | M.F. + 300 | (90.6%) | M.F. 119 | (98.8%) |

*Component A in above compositions is 99.9 parts by weight of (pbw) p,p'-oxybis(aniline) (OBA) and 23.1 pbw meta-phenylenediamine (MPDA).
**I.V., inherent viscosity, expressed in units of deciliters/gram of polymer (dl/g), was determined with an ASTM 100 Cannon-Fenske Viscometer at 77° F. and a solution consisting of .5 grams of polymer in 100 milliliters of dimethyl acetamide.
***M.F., melt flow, throughout this Specification and Claims is expressed as grams of extrudate per 10 minutes. The procedure used for measuring M.F. was: From 9 grams of polymer heated from room temperature (72° F.) to 620° F. over a period of 25–30 minutes in a standard Buehler mold assembly (1″ × 1 3/4″), ten 1″-2″ samples are extruded through a 1/16″ die, having a length to inside diameter of 10:1 by 1″ ram applying a force of 3,000 pounds thereto. Extrudate obtained during a known interval from said die are weighed, and expressed as grams of extrudate that would have flowed in an interval of 10 minutes under the above conditions. The percent solids of the polymer is given in parentheses after the observed M.F., because it has an influence thereon. A+ immediately preceding any value following M.F. means greater than.
****The value in [ ]following the value for M.F. under Final is the observed M.F. for the sample after being heated for an additional 2 hours at 425° F. over a previous 2 hours heating at 425° F., which is the value reported immediately above.

COMPRESSION MOLDING

Each sample was in the form of a cylinder having a diameter of 5″ and a length of ⅛″ and was prepared as follows:

1. Heating a cylindrical mold of 5″ in diameter with a sample of material therein to a temperature of 630° F. for 35–40 minutes;
2. Applying each of the following pressures for the time specified while maintaining the mold and sample of material at a temperature in the range of 630° F.–640° F.:

| | |
|---|---|
| 2½ | tons for 2 minutes |
| 5 | tons for 2 minutes |
| 10 | tons for 1 minute |
| 25 | tons for 4 minutes |
| 50 | tons for 1 minute |
| 25 | tons for 5 minutes |

3. Allowing the mold to cool to 450° F. under 25 tons when the sample was removed from the mold and tested according to ASTM D1708 for ultimate tensile strength and percent elongation at break. The results are given in TABLE 2 for some of the compositions reported in TABLE 1.

TABLE 2

| *Composition | Molded Article | Tensile Strength | Elongation |
|---|---|---|---|
| 1 | Satisfactory | 19,276 psi | 9.4% |
| 3 | Satisfactory | 18,219 psi | 8.5% |
| 5 | Unsatisfactory | Extremely Brittle | Broke in Mold |
| 6 | Unsatisfactory | Extremely Brittle | Broke in Mold |
| 7 | Unsatisfactory | 7,300 psi | 2.5% |
| 8 | Unsatisfactory | Extremely Brittle | Broke in Mold |

*See correspondingly numbered composition of TABLE 1. It is to be noted that in addition to an initial heating at 425° F. for 2 hours and prior to compression molding, each sample was further heated at 500° F. for 2 hours with occasional stirring.

It is to be noted that compression molding has been found to be useful as a screening test for possible injection moldable polymers. If a polymer cannot be compression molded to an ultimate tensile strength in the range 16–20 thousand with a percent elongation at break in the range 5–15% following the procedure hereinbefore set out, then it is very unlikely that it can be used to produce a satisfactory injection molded article. The main reason for somewhat lower values in ultimate tensile strength and percent elongation of compression molded articles as compared to injection molded articles is due to greater polymer degradation during compression molding than during injection molding.

INJECTION MOLDING

An injection molded article with composition 3 of TABLE 1 had after annealing an ultimate tensile strength value of 29,800 psi and a percent elongation at break of 15.3% when injection molded on a Stokes Machine. The process conditions used can be found in TABLE 3.

TABLE 3

| | |
|---|---|
| Moving Platen | 440° F. |
| Stationary Platen | 440° F. |
| Clamp Pressure | 175 tons for 18 seconds |
| Primary Injection Pressure | 19,000 psi and held for 6 seconds |
| Back Pressure | 200 psi |
| Booster | 2 seconds |
| Cycle Delay | 1 second |
| Extruder: | |
| Nozzle Temperature | 620° F. |
| Barrels: | |
| Front heated to | 630° F. |
| Center heated to | 620° F. |
| Back unheated | |
| Screw: | |
| 40 revolutions/minute | |
| L/D 16/1 | |
| Compression zero | |

The examples of this invention are intended to be illustrative only. Variations on them are readily apparent to a man of skill in the art and are intended to be within the scope of the invention.

THE INVENTION WHICH IS CLAIMED IS:

1. A process for preparing an improved amide-imide polymer comprising reacting in an organic solvent with each mole consisting of one or more aromatic primary diamines between about 0.92 and about 0.99 mole of substantially pure 4-trimellitoyl anhydride halide and between about 0.08 and about 0.01 mole of trimellitic acid anhydride.

2. The process of claim 1, wherein said aromatic primary diamine comprises at least one member selected from the group consisting of p,p'-oxybis (aniline, p,p'-methylene bis(aniline) and metaphenylenediamine.

3. The process of claim 1, wherein said mole of substantially pure 4-trimellitoyl anhydride halide is between about 0.97 to about 0.94 mole per mole of one or more aromatic primary diamines and the amount of trimellitic acid anhydride is between about 0.03 and about 0.06 mole per mole of one or more aromatic primary diamines, whereby said polymers at $98 \pm 2\%$ solids have a melt flow rate in the range of about 3 to about 40 grams/10 minutes.

4. The process of claim 3, wherein said one or more aromatic primary diamines is selected from the group consisting of p,p'-oxybis(aniline), p,p'-methylenebis(aniline), and metaphenylenediamine.

* * * * *

UNITED STATES PATENT OFFICE
CERTIFICATE OF CORRECTION

Patent No. 4,136,085      Dated January 23, 1979

Inventor(s) Robert Hanson

It is certified that error appears in the above-identified patent and that said Letters Patent are hereby corrected as shown below:

| Patent Column | Line | |
|---|---|---|
| 2 | 49 | "polyamidepolyacid" should read -- polyamide-polyacid -- |
| 2 | 58 | "polyamidepolyacid" should read -- polyamide-polyacid -- |
| 3 | 2 | "polyamidepolyacid" should read -- polyamide-polyacid -- |
| 4 | 68 | "A + pbw" should read -- A + 138 pbw -- |
| 5 | 4 | "A + pbw" should read -- A + 142.5 pbw -- |
| 5 | 19 | "by 1" ram" should read -- by a 1" ram -- |

UNITED STATES PATENT OFFICE
CERTIFICATE OF CORRECTION

Patent No. 4,136,085               Dated January 23, 1979

Inventor(s)          Robert Hanson

It is certified that error appears in the above-identified patent and that said Letters Patent are hereby corrected as shown below:

Patent
Column   Line 7      3    "(aniline," should read
             -- (aniline), --

7      5    "said mole" should read -- the amount --

Signed and Sealed this

Tenth Day of July 1979

[SEAL]

Attest:

LUTRELLE F. PARKER

Attesting Officer    Acting Commissioner of Patents and Trademarks